(12) United States Patent
Knopp et al.

(10) Patent No.: US 6,425,156 B1
(45) Date of Patent: Jul. 30, 2002

(54) METHOD FOR VARYING PROGRAMS STORED IN A PROGRAM-CONTROLLED HOUSEHOLD APPLIANCE

(75) Inventors: Lothar Knopp, Berlin; Frank Böldt, Brieselang, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/567,990

(22) Filed: May 10, 2000

Related U.S. Application Data

(63) Continuation of application No. PCT/EP98/07063, filed on Nov. 4, 1998.

(30) Foreign Application Priority Data

Nov. 10, 1997 (DE) .......................................... 197 49 657

(51) Int. Cl.⁷ ............................................... D06F 33/02
(52) U.S. Cl. ............................................... 8/159; 8/158
(58) Field of Search ........................... 68/12.02, 12.01, 68/12.23; 8/158, 159

(56) References Cited

U.S. PATENT DOCUMENTS

| 4,149,046 | A | * | 4/1979 | Bolin |
| 4,318,084 | A | * | 3/1982 | Scott et al. |
| 4,838,050 | A | * | 6/1989 | Azuma |
| 5,647,232 | A | * | 7/1997 | Boldt et al. |

FOREIGN PATENT DOCUMENTS

| DE | 42 04 399 A1 | 10/1992 |
| DE | 44 22 128 A1 | 1/1996 |
| DE | 195 05 485 A1 | 8/1996 |
| JP | 61-20592 | * 1/1986 |

* cited by examiner

Primary Examiner—Frankie L. Stinson
(74) Attorney, Agent, or Firm—Laurence A. Greenberg; Werner H. Stemer; Gregory L. Mayback

(57) ABSTRACT

Actuators on a control panel for entering single functions of an individual operating program cycle which can be invoked under a given name and can be properly executed under microprocessor control are also used for setting particular operating program sequences or particular parameter values of program functions. The actuators can be actuated in at least one sequence of function entries such that the sequence of function entries is a code for particular update functions.

6 Claims, 1 Drawing Sheet

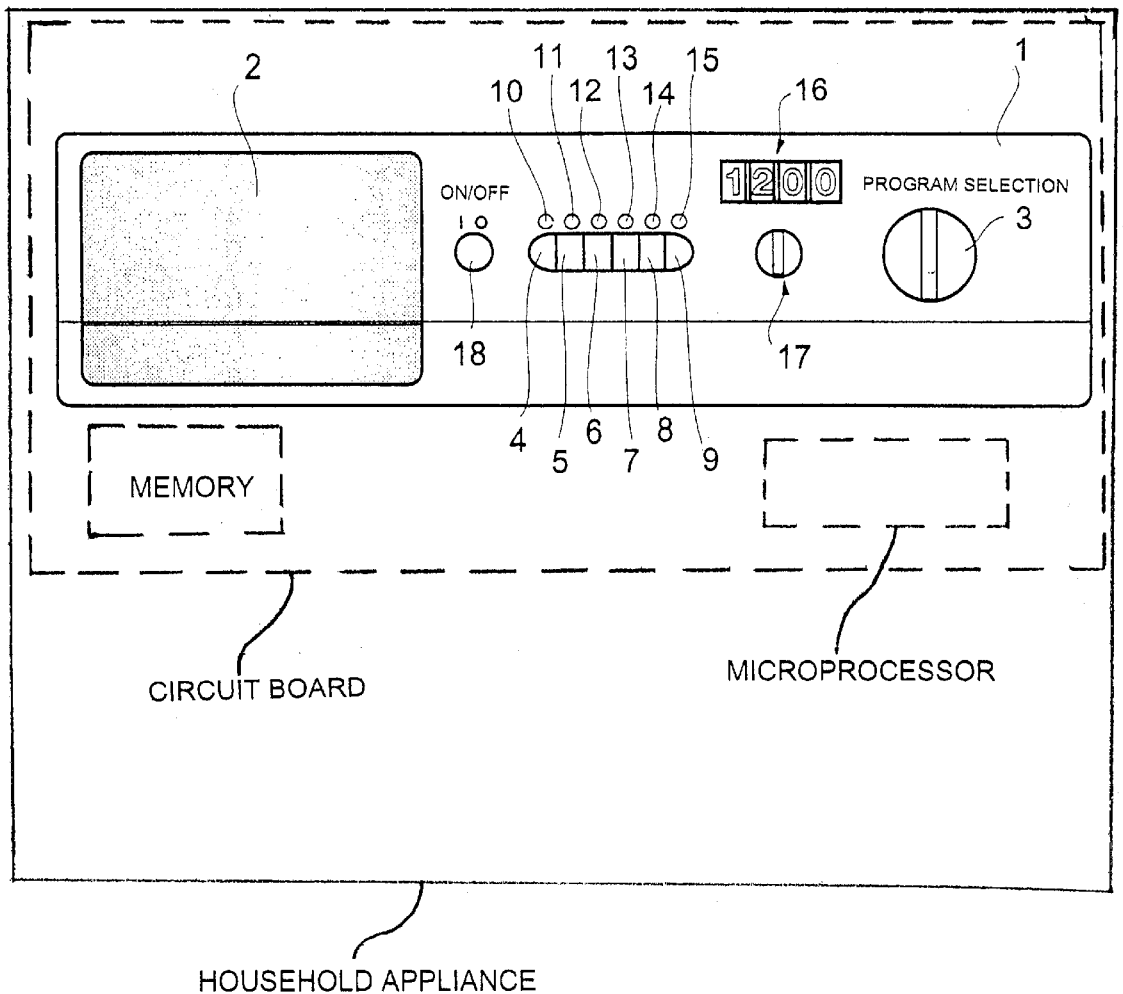

US 6,425,156 B1

METHOD FOR VARYING PROGRAMS STORED IN A PROGRAM-CONTROLLED HOUSEHOLD APPLIANCE

CROSS-REFERENCE TO RELATED APPLICATION

This application is a continuation of copending International Application No. PCT/EP98/07063, filed Nov. 4, 1998, which designated the United States.

BACKGROUND OF THE INVENTION

Field of the Invention

The invention relates to a method for varying programs stored in a program-controlled household appliance. The program-controlled household appliance has a control panel with actuators for entering single functions of an individual operating program cycle. The individual operating program cycle can be invoked under a name and can be properly executed under microprocessor control. The program-controlled household appliance also has a memory for different functions of this program cycle.

Such a method is disclosed, for example, in Published German Patent Application DE 44 22 128 A1. In this document, the factory's program presets can be adapted to customer requirements as a result of the electronic controller being freely programmable via a data input and output unit with a display. In order to adapt the program presets, further data or parameters need to be entered so that the existing program presets can be varied or supplemented. The process of entering the data or parameters is not explained in detail in Published German Patent Application DE 44 22 128 A1. Since no particulars are given about the type and manner of the data entry, it can be concluded that, in accordance with other conventional household appliances of this type, additional input actuators need to be provided which are not inherently necessary for invoking stored program presets. Furthermore, a display is necessary for the conventional device.

In addition, from Published German Patent Application DE 195 05 485 A1, washing machines are known whose control panels likewise have actuators for setting particular program functions. In these control panels, logic combinations for the operation of these actuators are set up such that competent persons (e.g. customer service engineers) can enter a code of particular control operations, specifically by a combined actuation of individual control actuators simultaneously, to change the household appliance to one of two program modes. This allows, on the one hand a programming by a customer service engineer, and on the other hand a restricted programming of the household appliance by the user. In addition, the predetermined combination of actuation operations can be used to invoke particular functions or particular customer service programs whose response can inform the customer service engineer observing the washing machine about the machine's correct operating program cycle. This allows to check the operating program cycle without having to observe the execution of the entire operating program cycle, which would take too long for an observation (see Published German Patent Application DE 42 04 399 A1). On the other hand, suitable coding operations allow to invoke so-called demonstration programs, in which a particular operating program cycle of the machine is simulated without functional elements of the washing machine actually being operated. This allows installed program cycles to be demonstrated on the washing machine's control panel.

In addition, washing machines are known e.g. from Published German Patent Application DE 40 01 279 A1 whose microprocessor-controlled program control device is connected via a data bus to an external interface to which a computer (e.g. a laptop computer) can be connected externally via a bus line in order to make particular changes to the microcomputer's installed program, e.g. changes to program sequences or to parameter values for the relevant program cycle. A disadvantage of such so-called update functions is the need to carry highly complex items of equipment (e.g. computers and accessories) for making changes to installed programs, especially since update operations are generally only concerned with short, minor changes.

SUMMARY OF THE INVENTION

It is accordingly an object of the invention to provide a method for varying programs stored in a program-controlled household appliance which overcomes the above-mentioned disadvantages of the heretofore-known methods of this general type and which provides a control operation suitable for carrying out appropriate update functions without having to use complex appliances for this purpose and without having to provide additional control actuators which are not necessary for invoking stored program presets.

With the foregoing and other objects in view there is provided, in accordance with the invention, a method for varying programs stored in a program-controlled household appliance, which includes the steps of:

providing a program-controlled household appliance having a control panel with actuators for entering functions of an operating program cycle, the operating program cycle being invokeable under a given name and being executable under microprocessor control, the program-controlled household appliance having a memory component for storing the functions of the operating program cycle; and using at least one given succession of function entries as a code for directly changing one of operating program sequences and parameter values of program functions, the at least one given succession of function entries need not be adhered to when making an entry to invoke a stored program.

In other words, the object of the invention is achieved in that one or more particular successions or sequences of function entries, which do not have to be adhered to when making an entry to retrieve or invoke a stored program, are used as a code for directly changing particular operating program sequences or particular parameter values of program functions. This allows competent persons to use a particular sequence of control operations, using the actuators which are provided on the control panel and are necessary anyway, to make alterations to installed program sequences or program parameters. In the case of control panels which also contain a display in the form of an alphanumeric display, such entry operations can also be monitored.

In accordance with another mode of the invention, the program-controlled household appliance is a washing machine or a dishwasher and the parameter values for affecting a water level in a tub, a temperature of a washing liquid, a drum speed, or a timing and a duration for particular processing steps during the operating program cycle are changed.

In accordance with yet another mode of the invention, the program-controlled household appliance is a washing machine or a dishwasher and the operating program sequences for affecting a sequence of operations including a water intake, a heating of a washing liquid, a low-speed drum movement, a high-speed drum movement, a circulation of the washing liquid or a pumping-out of the washing liquid are changed.

In accordance with a further mode of the invention, the program-controlled household appliance is a laundry dryer and the parameter values for affecting a temperature of a process air, a timing and a duration for particular processing steps, or a residual moisture in a laundry are changed.

In accordance with a further mode of the invention, the program-controlled household appliance is a laundry dryer and the operating program sequences for affecting a sequence of operations such as a drum movement, a process air feed, a cooling air feed or a condensation removal are changed.

In accordance with another mode of the invention, the sequence of function entries can also be achieved by using a rotary selector switch as control actuator, which can be set to different rotary positions for entering the code. By way of example, the additional actuation of a key, which is present anyway on the control panel, for an arbitrary function or a push function on the rotary selector switch itself can be used to confirm the entry in the relevant rotary position.

With the objects of the invention in view there is also provided, a method for varying a program stored in a program-controlled household appliance, which includes the steps of:

storing, in a memory component of the household appliance, the program for controlling an operating process cycle;

providing, on the household appliance, a control panel with actuators for selecting functions of the operating process cycle; and changing the program for controlling the operating process cycle with a given code by actuating at least one of the actuators in a given sequence, the given sequence being different from a sequence required for selecting the functions of the operating process cycle.

Other features which are considered as characteristic for the invention are set forth in the appended claims.

Although the invention is illustrated and described herein as embodied in a method for varying programs stored in a program-controlled household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a diagrammatic frontal view of a control panel configuration on a household appliance.

DESCRIPTION OF THE PREFERRED EMBODIMENTS

Referring now to the single FIGURE in detail, there is shown a control panel 1 provided on the right next to a gripping shell 2 for a detergent drawer in a washing machine. The control panel has a plurality of control actuators, namely a rotary selector switch 3 and six keys 4 to 9. Above the keys 4 to 9, LEDs 10 to 15 are provided for confirming an actuation, while an alphanumeric display 16 above a rotary selector switch 17 used for setting speed values, for example, is suitable for displaying parameter values (e.g. rotational speed values). A key 18 is used exclusively for turning the electronic controller, and hence the whole washing machine, on and off.

Behind the control panel 1 there is an electronic circuit board on which a plurality of electronic components are connected to one another by a conductor track lamination on the circuit board. The circuit board and the components provided thereon are schematically shown with dashed lines. Such electronic components regularly also include microprocessors, memory components, switches and the like. The entries of functions, which are made possible by the control actuators 3 to 9 and 17, are detected by such microprocessors and memory components and generally serve to define particular operating program sequences and parameter values for a program which is to be executed subsequently. Such program sequences and parameter values are defined by a manufacturer installation in the program control electronics.

In accordance with the invention, a competent person (e.g. a customer service engineer) can alter particular operating program sequences or particular parameter values for program functions by entering a particular succession or sequence of functions using the control actuators. By way of example, a customer service engineer can use or actuate the keys in a particular sequence in order to influence the time duration of a washing phase or to lower or raise the temperature of the washing liquid for a particular program sequence. Similarly, such program entries can also be the result of a combined use of the rotary selector switches 3 and 17 and the keys 4 to 9. By way of example, the succession or sequence of entries can be determined by respective settings of particular rotary positions of the rotary selector switch 3 and/or 17, while the rotary positions to be entered are confirmed by actuating a particular one of the keys 4 to 9 or by pressing the appropriate rotary selector switch. The alphanumeric display 16, for example, can be used to monitor or check the operations involved in the intervention. For this purpose, particular associated display images provided for appropriate measures and acknowledging the correct intervention operation need to be produced. In the case of parameter values which are to be altered, such images may be the display of particular numerical values.

Program elements which can be altered in washing machines and dishwashers may be the following functions, for example: water intake, heating of the washing liquid, drum movement, washing liquid circulation, and pumping-out of the washing liquid. In the case of laundry dryers, such program elements may be drum movement, right-hand rotation, left-hand rotation, process air feed, cooling air feed and condensation removal. The alterable program-function parameters which are possible in the case of washing machines and dishwashers are the following settings: washing-liquid level, washing-liquid temperature, time duration, timing of e.g. cycles or sequences, and drum speed. In the case of laundry dryers, the following parameters can be set: process air temperature, residual moisture, time duration, or the time control such as the timing of cycles or sequences. The particular items above are only examples of such program elements or parameters, other program elements may also be changed.

We claim:

1. A method for varying programs stored in a program-controlled household appliance, the method which comprises:

providing a program-controlled household appliance having a control panel with actuators for entering functions of an operating program cycle, the operating program cycle being invokeable under a given name and being executable under microprocessor control, the program-controlled household appliance having a memory component for storing the functions of the operating program cycle; and using at least one given succession of function entries as a code for directly changing one of operating program sequences and parameter values of program functions, the at least one given succession of function entries need not be adhered to when making an entry to invoke a stored program.

2. The method according to claim 1, which comprises:

providing one of a washing machine and a dishwasher as the program-controlled household appliance; and changing the parameter values for affecting at least one of a water level in a tub, a temperature of a washing liquid, a drum speed, and a timing and a duration for particular processing steps during the operating program cycle.

3. The method according to claim 1, which comprises:

providing one of a washing machine and a dishwasher as the program-controlled household appliance; and changing the operating program sequences for affecting a sequence of operations including at least one of a water intake, a heating of a washing liquid, a low-speed drum movement, a high-speed drum movement, a circulation of the washing liquid and a pumping-out of the washing liquid.

4. The method according to claim 1, which comprises:

providing a laundry dryer as the program-controlled household appliance; and changing the parameter values for affecting at least one of a temperature of a process air, a timing and a duration for particular processing steps, and a residual moisture in a laundry.

5. The method according to claim 1, which comprises:

providing a laundry dryer as the program-controlled household appliance; and changing the operating program sequences for affecting a sequence of operations including at least one of a drum movement, a process air feed, a cooling air feed and a condensation removal.

6. The method according to claim 1, which comprises:

providing a rotary selector switch as one of the actuators; and setting the rotary selector switch to different rotary positions for entering the code.

* * * * *